(12) United States Patent
Jones

(10) Patent No.: US 6,560,235 B1
(45) Date of Patent: May 6, 2003

(54) UNIVERSAL COMMUNICATION SYSTEM

(75) Inventor: Nicolas D. L. Jones, Kitchener (CA)

(73) Assignee: Woodhead Industries, Inc., Deerfield, IL (US)

( * ) Notice: Subject to any disclaimer, the term of this patent is extended or adjusted under 35 U.S.C. 154(b) by 0 days.

(21) Appl. No.: 09/335,831

(22) Filed: Jun. 18, 1999

Related U.S. Application Data

(60) Provisional application No. 60/108,565, filed on Nov. 16, 1998.

(51) Int. Cl.[7] .............................................. H04L 12/28
(52) U.S. Cl. ...................................... 370/401; 370/465
(58) Field of Search ................................ 370/363, 368, 370/371, 374, 378, 379, 381, 382, 395.5, 395.7, 401, 402, 465; 709/214, 215

(56) References Cited

U.S. PATENT DOCUMENTS 5,706,290 A  *  1/1998  Shaw et al. ................. 370/465
6,266,700 B1 *  7/2001  Baker et al. ................. 709/230

* cited by examiner

Primary Examiner—Wellington Chin
Assistant Examiner—Brenda Pham
(74) Attorney, Agent, or Firm—Emrich & Dithmar

(57) ABSTRACT

A universal communication system (UCS) consists of a number of communication modules that connect automation devices including controllers, sensors, actuators and input/output components to various communication networks. Each module transfers data between an automation device and the network using network-specific services and protocols. All modules present the same physical, electrical and logical interface to the automation device. Configuration data that customizes the presentation of the device and its data to the network is stored in non-volatile memory in the communication module. In this way, a single device design can support multiple network types by using appropriately configured modules.

21 Claims, 11 Drawing Sheets

| Pin | Name | Description |
|---|---|---|
| A1 | VDD | +5VDC Supply |
| B1 | VSS | DC Common |
| A2 | D0 | Data Bit 0 |
| B2 | D1 | Data Bit 1 |
| A3 | D2 | Data Bit 2 |
| B3 | D3 | Data Bit 3 |
| A4 | DP | Optional Data Parity Bit (even parity) |
| B4 | VSS | DC Common |
| A5 | D4 | Data Bit 4 |
| B5 | D5 | Data Bit 5 |
| A6 | D6 | Data Bit 6 |
| B6 | D7 | Data Bit 7 |
| A7 | /RD | Read Strobe – low level enables data out from selected register |
| B7 | /WR | Write Strobe – rising edge latched data into selected register |
| A8 | /SEL | Module Select – low to enable read and write functions |
| B8 | VSS | DC Common |
| A9 | A0 | Register Address Bit 0 – selects register for read/write |
| B9 | A1 | Register Address Bit 1 – selects register for read/write |
| A10 | A2 | Register Address Bit 2 – selects register for read/write |
| B10 | BA0 | Module Address Bit 0 – selects module for read/write |
| A11 | BA1 | Module Address Bit 1 – selects module for read/write |
| B11 | /IRQ | Interrupt from UCS – low indicates interrupt is present |
| A12 | /RESET | Module Reset – low to hardware reset module |
| B12 | /FAULT | Bus Fault Indication – low indicates fault |
| A13 | VDD | +5VDC Supply |
| B13 | VSS | DC Common |

FIG. 4

| Module Status Code | Description |
|---|---|
| HARDWARE_ERROR | The module self-test detected a hardware error |
| RUN_MODE | The module is operating normally |
| STARTUP_ERROR | The module cannot start due to a configuration fault |
| ASSERT | The module firmware has detected an unexpected condition |
| WATCHDOG_TIMEOUT | The hardware watchdog timer has expired module is not operating |

FIG. 6

| Interface Status Code | Description |
|---|---|
| CLOSED | IRAM interface is closed - data exchange with network is disabled |
| OPEN | IRAM interface is open - data exchange with network is enabled |
| HEARTBEAT_FAULT | IRAM interface is faulted due to heartbeat timeout (same behavior as CLOSED) |

FIG. 7

| Network Status Code | Description |
|---|---|
| OFFLINE | Network interface is offline |
| OFFLINE_FAULT | Network interface is offline due to a network fault |
| OFFLINE_BAD_CFG | Network interface is offline due to a configuration fault (invalid or duplicate station address, invalid baud rate, etc.) |
| ONLINE | Network interface is online and may be exchanging data using non-secure services, no faults detected.<br>Failure of non-secure services cannot be detected or reported. |
| ONLINE_FAULT | Network interface is online and may be exchanging data, one or more secure network services has failed.<br>Non-secure services may be changing data in IRAM but failure of such services cannot be detected or reported. |
| ONLINE_ACTIVE | Network interface is online and exchanging data using a secure service, no faults detected.<br>Any failure of the secure service is reported.<br>Non-secure services may be changing data in IRAM but failure of such services cannot be detected or reported. |
| ONLINE_IDLE | Network interface is online and exchanging data using a secure service, but is receiving idle messages (*the definition of what constitutes an idle message is network specific*), no faults detected.<br>Any failure of the secure service is reported.<br>Non-secure services may be changing data in IRAM but failure of such services cannot be detected or reported. |
| ONLINE INACTIVE | Network interface is online and was previously exchanging data using a secure service that has been suspended, no faults detected.<br>Non-secure services may be changing data in IRAM but failure of such services cannot be detected or reported. |

FIG. 8

| Trigger Code | Description |
| --- | --- |
| OPEN | Sent to the communication module to open the data exchange interface |
| HEARTBEAT | Sent to the communication module at regular intervals to keep the data exchange interface open. |
| DATA_CHANGE | Notifies the communication module when data has been changed. |
| CLOSE | Sent to the communication module to close the data exchange interface |

FIG. 10

| Event Code | Description |
| --- | --- |
| OPEN | Open Interface trigger success response - data exchange interface is open. |
| HEARTBEAT | Heartbeat trigger success response - heartbeat timer has been restarted. |
| DATA_CHANGE | Notifies the automation device when data has been changed. |
| DATA_IDLE | Notifies the automation device when data is being updated by a secure service, and the service is sending an idle indication. Support for, and the nature of, the idle indication is network specific. |
| DATA_INVALID | Notifies the automation device when data was being updated by a secure service, and the service has faulted or been suspended. |
| TRIGGER_ERROR | An invalid trigger has been processed |

FIG. 11

| Interface Status Code | CLOSED or HEARTBEAT_FAULT | OPEN | |
|---|---|---|---|
| Network Status Code | (always OFFLINE) | OFFLINE | ONLINE |
| OPEN Trigger | Interface status = OPEN Send OPEN event | Send TRIGGER_ERROR event | |
| HEARTBEAT Trigger | Send TRIGGER_ERROR event | (Re)start heartbeat timer, Send HEARTBEAT event | |
| DATA_CHANGE Trigger | Send TRIGGER_ERROR event | Ignore | Cross-reference changed IRAM location with configuration data, ignore new data or transmit new data to network as appropriate. |
| CLOSE Trigger | Send TRIGGER_ERROR event | Network Status = OFFLINE, Interface Status = CLOSED | |
| Secure Service Initiated | N/A | N/A | Network Status = ONLINE_ACTIVE |
| Network Data Received | N/A | N/A | Cross-reference network service with config. data. Ignore data, send an error response to the network or store received data in designated IRAM location(s) as appropriate. If data stored in IRAM differs from previous contents, send DATA_CHANGE event(s) for affected location(s). If data was received via a previously "idle" service, send DATA_CHANGE event(s) for affected location(s) and change Network Status to ONLINE_ACTIVE |
| "Idle" Indication Received | N/A | N/A | Cross-reference "Idle" network service with configuration data and send DATA_IDLE event(s) for affected location(s). Network Status = ONLINE_IDLE |
| Secure Service Faulted | N/A | N/A | Cross-reference faulted network service with configuration data and send DATA_INVALID event(s) for affected location(s). Network Status = ONLINE_FAULT |
| Secure Service Terminated | N/A | N/A | Network Status = ONLINE_INACTIVE |
| Network Data Send Request | N/A | N/A | Cross-reference requesting service with configuration data, ignore request, or transmit data from designated IRAM location(s) as appropriate. |
| Heartbeat Timer Expires | Ignore | Network Status = OFFLINE, Interface Status = HEARTBEAT_FAULT | |

FIG. 12

UNIVERSAL COMMUNICATION SYSTEM

RELATED APPLICATION

This application claims the benefit of copending U.S. Provisional Application No. 60/108,565, filed Nov. 16, 1998.

FIELD OF THE INVENTION

This invention relates to industrial automation systems employing communication networks, and more particularly, to a network-independent communication module interface suitable for use in all components of the automation system.

BACKGROUND OF THE INVENTION

Industrial automation systems frequently use communication networks to exchange data between devices. A multitude of industrial communication network types exist, and development of new networks is a continuing trend. These networks employ a wide variety of communication models, protocols and services. Several network types share the common goal of making similar devices interchangeable by defining a common communication model, or device profile, for specific device types.

Due to the wide variety of network types commonly employed in industrial automation applications, devices must provide support for more than one network type in order to be competitive. Due to the variances between network types, devices are typically custom-designed at some level to support each network type. While it is common for device manufacturers to use proprietary hardware modules for interchangeable network connections, these modules and the devices that use them are designed to support a limited set of network types identified prior to development.

With the introduction and market acceptance of new network types it is certain that devices will be required to support new network types during their life cycle. The current method of implementing communication interfaces does not provide the flexibility of supporting additional network types without the cost and delay of modifying the device itself.

SUMMARY OF THE INVENTION

The present invention is an architecture and interface definition for a universal communication system where various communication interfaces are implemented as interchangeable modules that insulate the industrial automation device from the specifics of the communication network in question. The interchangeable nature of the communication modules allows for a single device design that can communicate on any existing, or future, network type.

Importantly, the present invention provides an abstract data-exchange architecture that conceals the specifics of the network interface hardware, communication model, protocols and services. This approach eliminates any network dependencies of the industrial automation device.

Specifically, the present invention provides an industrial automation device with multi-network connectivity employing a network-independent core component that implements the primary function of the device in combination with an appropriately configured communication module. The core component exchanges data with the communication module via an abstract interface. The communication module presents the data to the network according to network requirements and configuration data stored in the module. The configurable nature of the communication module allows the data to be presented in accordance with a desired device profile.

The industrial automation device transfers data to/from the communication module by placing it in interface RAM (IRAM) in the communication module. Access to the IRAM is via a non-traditional indirect interface. The communication module presents itself to the CPU in the automation device as 8 memory-mapped byte-wide registers. Access to data in IRAM is achieved by first writing the desired IRAM address into designated registers, and then either reading or writing 32-bits of data to/from four other registers. With this method, the interface IRAM can be accessed using 32-bit atomic transfers regardless of the data bus size of the CPU in the automation device and the actual data width of the IRAM. Furthermore, this interface provides a large amount of IRAM space (up to 128 Kbytes) while requiring only 8 memory locations in the automation product's address space. Since data is transferred in 32-bits at a time, data items up to 32-bits in size are transferred without interruption, eliminating the possibility of data corruption due to conflicting accesses to the same IRAM location by both the automation device and the network.

It is one objective of the invention, then, to provide a method of interfacing an 8-bit or larger CPU to a large block of interface RAM, providing multi-byte data transfers independent of the actual data width of the interface RAM and requiring minimum address space in the CPU.

The logical interface implemented in IRAM uses an abstract data exchange model rather than a communication interface model, in this way the specifics of each network are eliminated from the interface.

The IRAM is divided into two main areas; a pre-defined control/status area and a free-format data exchange area. The industrial automation device controls and monitors the transfer of data through pre-defined IRAM locations in the control/status area. Data to be exchanged with the network is placed into the data exchange area. Fixed-configuration automation devices have an IRAM location assigned to each data item when the device is developed. The communication module configuration data maps these fixed-location data items to specific network transactions. Variable configuration automation devices rely on a software configuration tool to assign an IRAM location to each data item and pass the resulting memory-map to the automation device and to the communication module as network-specific configuration data.

The automation device initializes the data exchange interface by issuing an "open" command. After the "open" command the communication module is enabled to begin exchanging data with the network. The status of data exchange is indicated by pre-defined locations in the control/status area. The automation device sends "heartbeat" commands at regular intervals, and expects timely responses from the communication module. In this manner either party can detect failure of the other. The automation device terminates the data exchange interface and stops network data exchange by issuing a "close" command.

Detailed network control and status is intentionally excluded from the pre-defined control/status area due to its network-specific nature. When required, this data is instead mapped into the data exchange area and is treated the same as data to/from the network. In this way, status and control information about the network is still available, but it is accessed using the same generic interface as data to be transferred through the network.

Thus, it is another objective of this invention to employ a generic data-exchange model excluding any network-specific elements from the communication module interface while preserving access to network-specific control/status. Furthermore, it is also the objective of this invention to ensure the integrity of the data exchange interface permitting both the automation device and the communication module to take appropriate action in the case of a failure.

Notifications of occurrences in the data exchange interface are passed between the automation device and the communication module. These notifications relate to changes in status of the automation device, communication module or network, changes in the values of data items or changes in validity of data items.

It is therefore, another objective of this invention to maximize responsiveness to occurrences without overtaxing the automation device's CPU as might be expected because of the generic nature of the interface.

The communication module is configured by setting network protocol options and defining mappings between data in the IRAM and specific network services. Applicable network protocols and services can be mapped to IRAM locations, values in non-volatile memory or constants. The flexibility of this configuration scheme permits the automation device data to be presented to the network in any manner, including constant data items common in many "device profiles."

Thus it is another objective of this invention to present automation device data to the network with total flexibility allowing devices to be used with networks they were not originally designed for.

Other features and advantages of the present invention will be apparent to persons skilled in the art from the following detailed description of a preferred embodiment accompanied by the attached drawing wherein identical reference numerals refer to like parts in the various views.

BRIEF DESCRIPTION OF THE DRAWINGS

FIG. 4 defines the signal assignment of the 26-pin universal communication system bus connector shown in FIG. 5;

FIG. 6 is a list of codes such as used to report the status of the communication module illustrated in FIG. 1;

FIG. 7 is a list of codes such as used to report the status of a generic data exchange interface of the communication module illustrated in FIG. 1;

FIG. 8 is a list of codes such as used to report, in a generic fashion, the status of a network connected to the communication module as illustrated in FIG. 1;

FIG. 10 is a list of trigger codes which may be sent to the generic data exchange interface of the communication module illustrated in FIG. 1;

FIG. 11 is a list of event codes such as may be received from the generic data exchange interface of the communication module illustrated in FIG. 1;

FIG. 12 is a state-event-matrix that describes the reaction of the communication module illustrated in FIG. 1, in response to each of the trigger codes listed in FIG. 10 and both send and receive network transactions, according to data exchange interface status code of FIG. 7 and network status code of FIG. 8;

DETAILED DESCRIPTION OF PREFERRED EMBODIMENT

Figure 1:
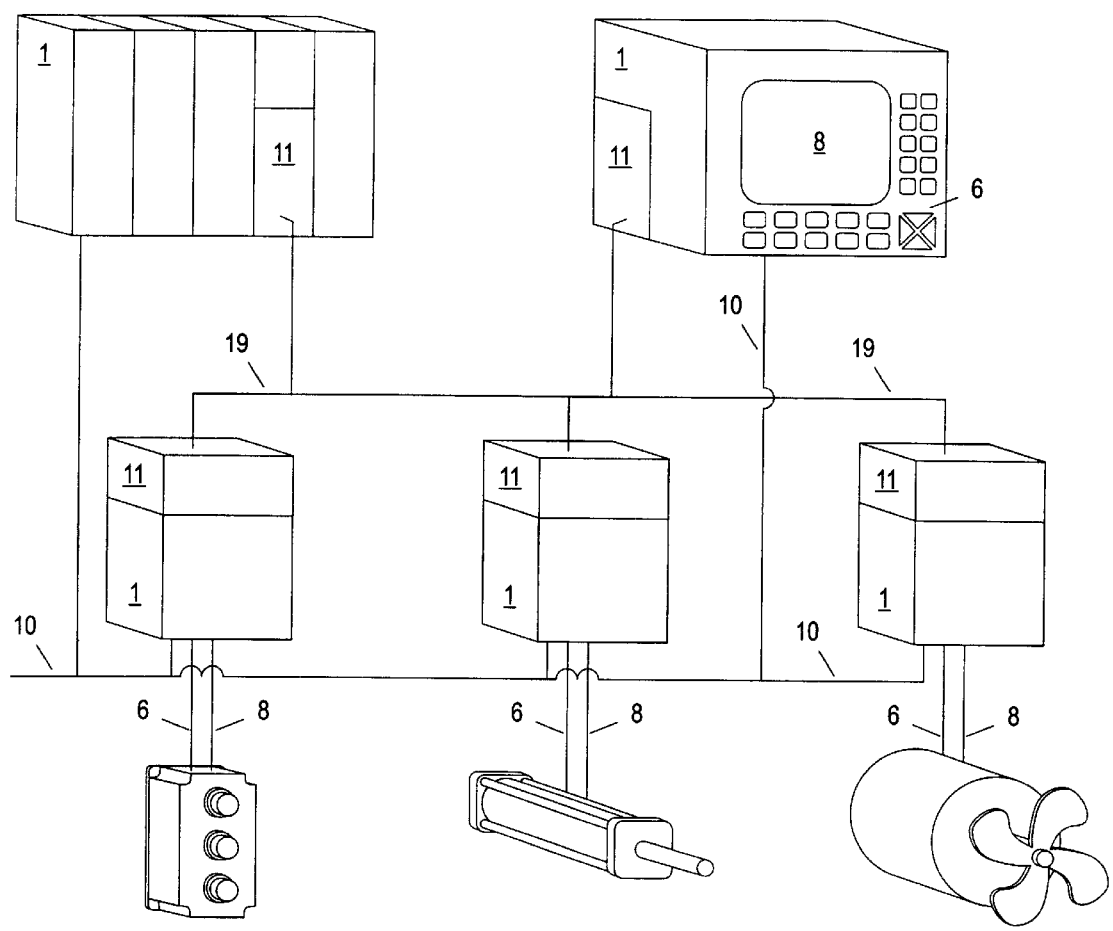
FIG. 1 is a combined simplified block and schematic representation of an automation system incorporating a variety of typical automation devices with network connectivity provided by an interchangeable communication module in accordance with a preferred embodiment of the present invention.

Referring to FIG. 1, a typical automation system is comprised of several automation devices 1 connected to a common communication network 19. The automation devices receive electrical power from independent power wiring 10 or, in some cases, by power conductors included in the communication network cable. Each automation device may have one or more outputs 8, which control actuators or operator displays, and/or one or more inputs 6, which receive feedback from sensors or operator input devices. The function of some types of automation devices 1 do not require directly connected outputs or inputs, as these devices perform their function based on data received from the network and report the results back to the network. Each automation device 1 implements connectivity to the network 19 with a respective communication module 11. The communication modules 11 completely insulate the automation devices from the details of the network 19, permitting the same automation devices 1 to be interconnected with a different type of network 19 simply by replacing the communication modules 11.

Universal Communication System (UCS) Applied to an Automation Device

Figure 2:
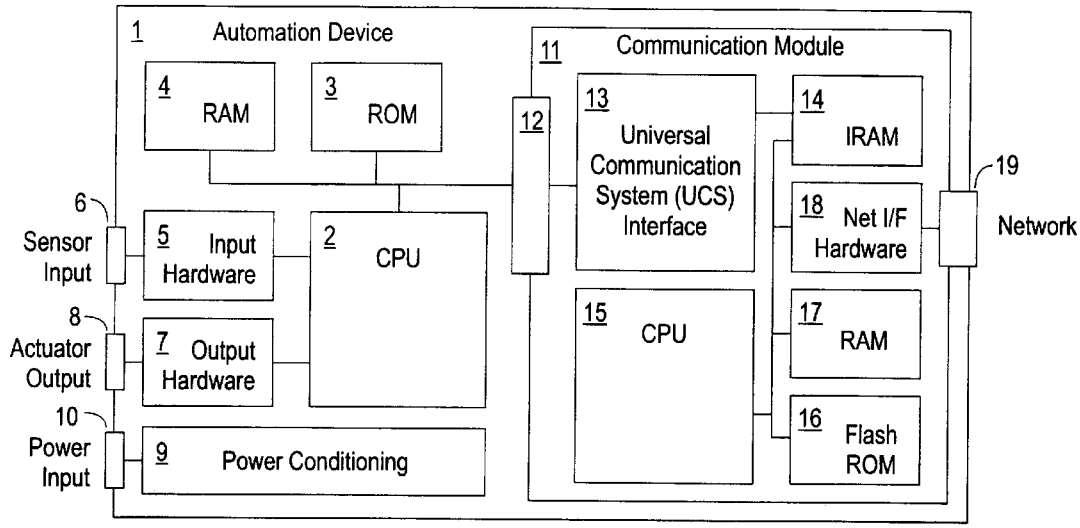
FIG. 2 is a simplified block diagram of an automation device with network connectivity provided by the communication module illustrated in FIG. 1.

Referring now to FIG. 2, there is shown an example of an automation device 1 with network 19 connectivity which combines electronic hardware and software elements 2,3,4, 5,7,9 and 10 that perform the primary function of the device with a communication module 11 that implements the network interface.

A power conditioning circuit 9 in the automation device converts the externally connected power 10 to a suitable level for the other hardware components 2,3,4,5 and 7 and also supplies power to the communication module 11.

The automation device 1 has a CPU 2 that directs its operation according to a control program typically stored in ROM 3 with local data storage provided by a RAM 4. In many cases the ROM 3 and/or RAM 4 are integral to the CPU 2. The control program may examine inputs 5,6 and may control outputs 7,8 as part of its operation. The actual number and type of inputs and outputs is determined by the automation device's requirements, with only one input and one output shown in the interest of simplicity.

The components described to this point, with the exception of the communication module 11, implement the primary function of the automation device. Many automation devices are capable of operating in a stand-alone mode without network communication.

The communication module 11 is logically separate from the other components and is typically implemented on a separate, interchangeable circuit board. The automation device CPU 2 exchanges data with the communication module 11 by accessing the interface RAM (IRAM) 14 through the UCS bus 12 and the UCS interface 13. The communication module 11 has a separate CPU 15 that directs its operation according to a control program stored in Flash ROM 16 with local data storage provided by a RAM 17. The communication module CPU 15 exchanges data with the automation device 1 by accessing the IRAM 14 and interacting with the UCS interface 13.

Figure 3:
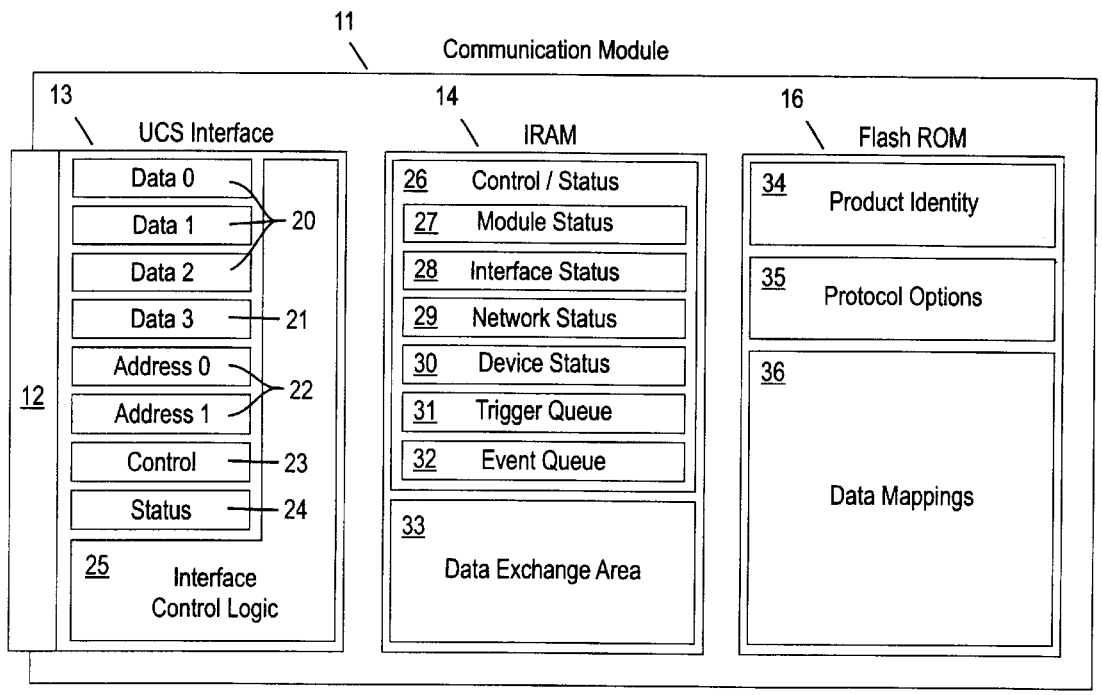
FIG. 3 is a logical block diagram of the communication module illustrated in FIG. 1.
Figure 5:
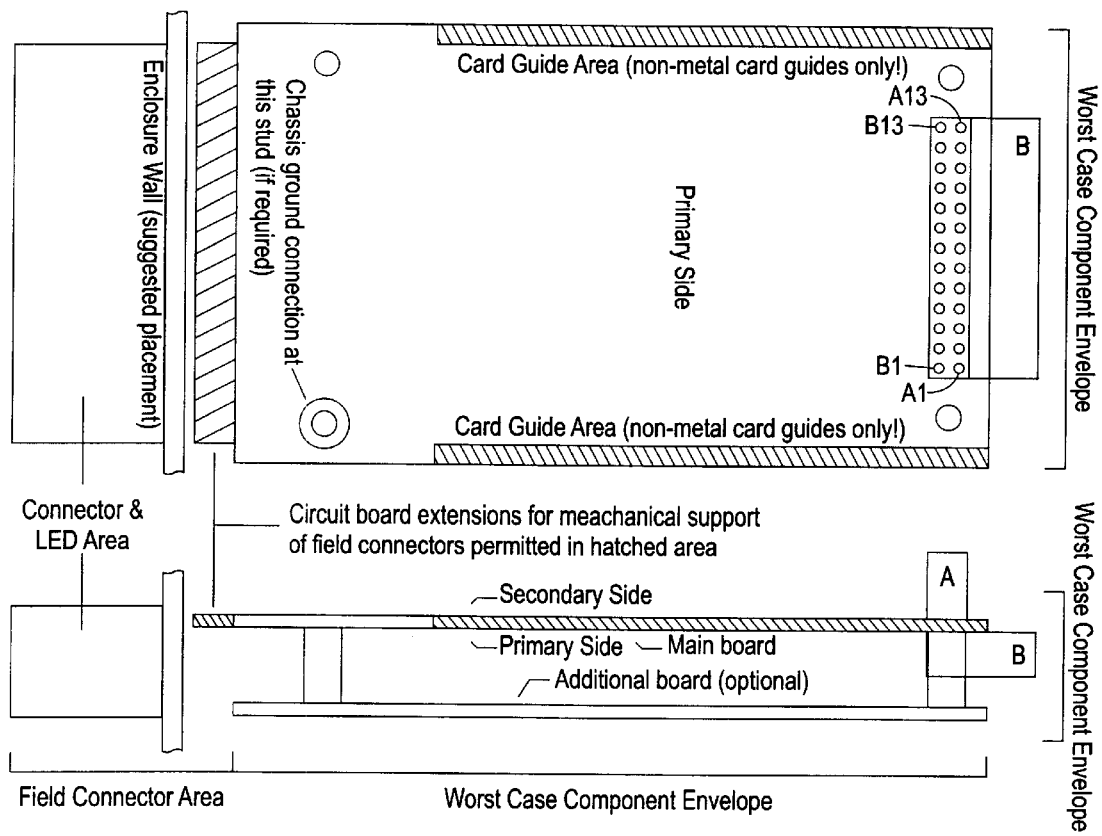
FIG. 5 is an illustration of the circuit board form-factor of the interchangeable communication module illustrated in FIG. 1.

Referring also to FIGS. 3, 4 and 5, the UCS bus 12 is compatible with standard CPU bus interface techniques and includes interface signals sufficient to access the eight byte-wide registers in the UCS interface 13. The UCS bus 12 also includes signals for data parity check and reporting, module hardware reset, two additional address lines which permit up to four UCS modules on the same bus and an interrupt signal from the module, the operation of which is in accordance with standard interface techniques.

Accessing IRAM through the UCS Interface

The automation device's CPU 2 accesses IRAM 14 indirectly through the registers 20,21,22,23 and 24 in the UCS interface 13.

To read 32-bits of data from the IRAM 14, the automation device's CPU 2 writes the 15-bit target IRAM address with a "1" in the most significant bit (MSB) to the address registers 22. The address write with MSB equal to "1" triggers the interface control logic 25 to transfer the 32-bit IRAM data identified by the 15-bit address (not including the MSB) into the data registers 20,21. After the transfer has completed, the automation device's CPU 2 reads the data one byte at a time from the data registers 20, 21. A read from the data 3 register 21 triggers the interface control logic 25 to increment the address in the address registers 22 and repeat the data transfer procedure with the new address. With this technique, large blocks of data stored in consecutive IRAM locations can be read efficiently with only one access to the address registers 22.

To write 32-bits of data to the IRAM 14, the automation device's CPU 2 writes the 15-bit target IRAM address with a "0" in the most significant bit (MSB) to the address registers 22 followed by 4 bytes of data to the data registers 20,21. The write to the data 3 register 21 triggers the interface control logic 25 to transfer the contents of the data registers 20,21 into the IRAM location identified by the 15-bit address and then to increment the address in the address registers 22. At this point the UCS interface 13 is ready to write data to the next sequential IRAM location. With this technique large blocks of data can be written into and stored in consecutive IRAM locations efficiently with only one access to the address registers 22.

When a read or write transaction is triggered, a flag in the status register 24 is set to "1" indicating that the interface control logic is busy. The automation device's CPU 2 must wait until this flag is cleared to "0," indicating the completion of the transfer, before accessing the data registers 20,21 or address registers 22.

Abstract Data Exchange Interface

Understanding the foregoing description of IRAM access using the UCS interface 13, all further references to reading and/or writing data in IRAM assume the indirect access method described herein.

With reference now to FIGS. 2 and 3, the IRAM 14 in the communication module 11 is organized with a pre-defined control/status area 26 and a free-format data exchange area 33.

The control/status area 26 contains data structures common to all types of communication modules that facilitate the exchange of data independent of network type. The module status area 27 reports the status of the communication module 11, indicating any fatal error preventing operation of the module by indication of the appropriate status code listed in FIG. 6. The interface status area 28 reports the condition of the data exchange interface between the automation device 1 and the communication module 11 by indication of the appropriate status code from FIG. 7. The network status area 29 indicates the status of data exchange with the network communication interface and reports communication link errors by indication of a generic status code from FIG. 8. By examination of module status 27, interface status 28 and network status 29 areas, the automation device 1 can determine the complete operational status of network data exchange interface through the communication module 11 and take proper action should a fault be reported.

Figure 9:
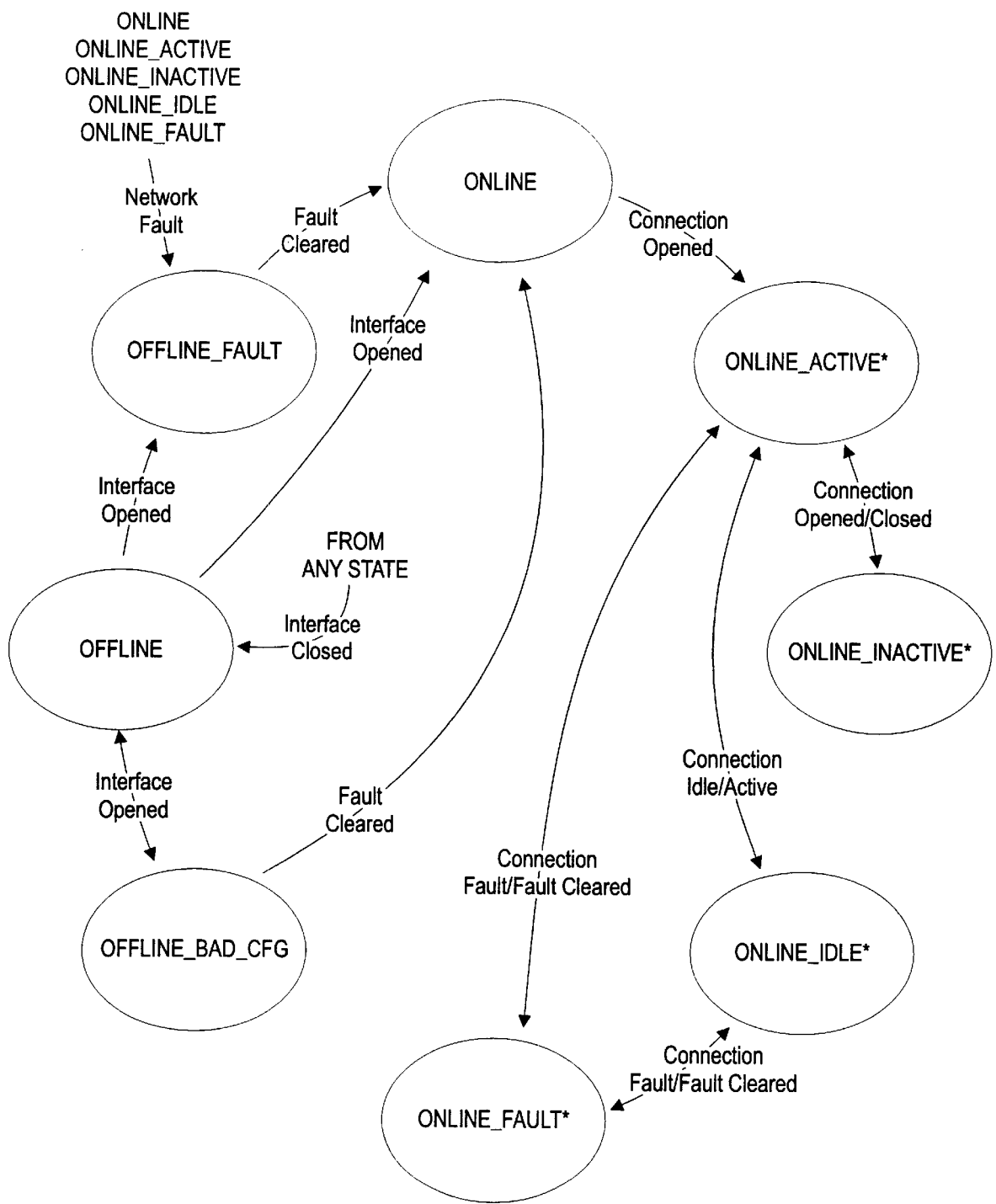
FIG. 9 is a state-transition diagram that illustrates the transitions between network status codes as listed in FIG. 8 and the cause of each transition.

Referring to FIGS. 9 and 12, there are respectively shown a state transition diagram and a state event matrix illustrating the sequence of operations carried out by the Universal Communication System of the present invention. FIG. 9 shows the possible NET_STATUS_CODE transitions for the Network Status Codes shown in FIG. 8 and the occurrences that cause the transitions. In FIG. 9, each oval, or bubble, represents a state or condition, while an arrow connecting a pair of ovals represents an event or occurrence. Thus, for example, when the interface is closed and the network interface is offline, the operating program of the system can take various actions when the interface is opened. For example, the program may detect an offline fault and proceed to the OFFLINE_FAULT state for clearing a network fault. The program may also proceed to the ONLINE state for exchanging data using nonsecure services, providing no network faults are detected. Finally, the program may proceed from the interface offline state when the interface is opened to the OFFLINE_BAD_CFG state where the interface remains offline due to a configuration fault such as an invalid or duplicate station address, an invalid baud rate, etc. From FIGS. 8, 9 and 12, the various states or conditions of the system as well as the actions available when in a given state can be determined.

The device status area 30 contains data that reports the status of the automation device to the communication module. Depending on the requirements of the specific network protocol, faults indicated in the device status area 30 may be reported to the network, or may affect operation of data exchange with the network. The trigger queue 31 provides a means for the automation device 1 to pass commands and notifications of occurrences as listed in FIG. 10 to the communication module 11. Similarly, the event queue 32 provides a means for the communication module 11 to pass responses to commands and notifications of occurrences as listed in FIG. 11 to the automation device 1. The trigger and event queues 31,32 are implemented as circular queues or first-in first-out (FIFO) buffers using established programming techniques with management fields located in the control/status block 26.

To enable data exchange with the network 19, the automation device 1 sends the OPEN trigger of FIG. 10 through the trigger queue 31. Upon processing the OPEN trigger, the communication module 11 changes the interface status 28 to OPEN, enables network data exchange and sends the OPEN event of FIG. 11 through the event queue 32.

Once data exchange has been enabled as described herein, the automation device 1 sends the HEARTBEAT trigger of FIG. 10 through the trigger queue 31 at regular intervals. Upon processing the HEARTBEAT trigger, the communication module 11 (re)starts a heartbeat fault timer and sends the HEARTBEAT event of FIG. 11 through the event queue 32 by way of response. If the communication module 11 detects expiration of the heartbeat fault timer before the next HEARTBEAT trigger is received, it changes the interface status 28 to HEARTBEAT_FAULT and disables network data exchange.

Once data exchange has been enabled as described herein, the automation device 1 is free to exchange data with the network 19 by way of the data exchange area 33 in IRAM 14. When the automation device 1 changes a data value stored in the data exchange area 33, it sends the DATA_CHANGE trigger of FIG. 10 through the trigger queue 31. Upon processing the DATA_CHANGE trigger, the communication module 11 takes the necessary action to report the new data to the network. When the communication module 11 changes a data value stored in the data exchange area 33, it sends the DATA_CHANGE event of FIG. 11 through the event queue 32 indicating the affected part(s) of the data exchange area 33. Upon processing the DATA_CHANGE event, the automation device 1 takes the necessary action to apply the new data value(s) to its operation.

Some network types make use of secure communication services that permit identification of data that is no longer valid due to a failed or suspended service. If such failure is detected, the communication module sends the DATA_INVALID event of FIG. 11 through the event queue 32 indicating the affected part(s) of the data exchange area 33. Upon processing the DATA_INVALID event, the automation device 1 takes the necessary action to react to the invalid data.

Some network types make use of secure communication services that permit identification of data that is temporarily not updated. If such condition is detected, the communication module sends the DATA_IDLE event of FIG. 11 through the event queue 32 indicating the affected part(s) of the data exchange area 33. Upon processing the DATA_IDLE event, the automation device 1 takes the necessary action to react to the idle data.

To cease the exchange of data with the network 19, the automation device 1 sends the CLOSE trigger of FIG. 10 through the trigger queue 31. Upon processing the CLOSE trigger, the communication module 11 disables network data exchange and changes the interface status 28 to CLOSED.

As described herein, the automation device 1 exchanges data with the communication module 11 by way of an abstract data exchange interface that is secure in all respects but in no way reflects the manner of presentation of data to the network 19. Furthermore, the automation device 1 can monitor and report the status of data exchange with the network 19 by way of generic status codes without any network-specific concepts.

Presentation of Automation Device Data to Network

Referring again to FIGS. 2 and 3, the communication module 11 maps network services to the data exchange area 33 in the IRAM 14 according to configuration data stored in flash ROM 16 thus completing the data path from the automation device 1 to the network 19.

Configuration data in flash ROM 16 is network-specific in nature and therefore can only be described in a very general way. Configuration data can typically be divided into three main categories; product identity information 34, protocol options 35 and data mappings 36.

The product identity data 34 supplies network-specific information such as manufacturer, product name, version, serial number, etc., that identifies the communication module 11 on the network 19.

Many networks have optional and/or configurable protocols and/or services. Protocol options configuration 35 contains network-specific data that selects and configures the protocol options supported by the communication module 1.

The data mapping configuration 36 controls how the communication module 11 presents the data exchange area 33 to the network 19. For each supported network protocol or service, the data mapping configuration 36 defines the location in the data exchange area 33 where the corresponding data is located.

Some network protocols, such as the I/O data update services typical of many networks, transport a compound block of data. In the case of networks that make use of device profiles, the format of these compound data blocks is pre-defined. In order to match automation device data to these varied data formats, the data mapping configuration 36 defines the format and location of each component of the compound data block. In this way, many different compound data blocks can be mapped to the data exchange area 33, thus eliminating the need for any special organization of the data exchange area 33 to support these special data block formats.

Many network protocols provide general-purpose services that provide access to a large amount of data using a data address in conjunction with the service. The data address format is network-specific in nature, and in the case of device profiles, the address for specific data items is pre-defined. In order to support these types of protocols, the data mapping configuration 36 assigns a specific part of the data exchange area 33 to each network-specific address. In this way, any pre-defined data layout with reference to network-specific addressing can be mimicked by the communication module 11 without the necessity of the actual data layout in question being mirrored by the layout of data in the data exchange area 33.

Furthermore, the data mapping configuration 36 can call for data type conversion value range conversion and other more complex functions in order to present automation device data in a manner demanded by the network and/or device profile. This data type and range conversion function is typically applied, but not limited to, engineering unit conversion (i.e. metric to imperial units).

Some device profiles contain data not directly relevant to the operation of the automation device. This data includes version information, product capability information and other data that is, almost without exception, constant in nature. In order to implement these components of a device profile, all data mappings can contain references to constant data in place of and interleaved with references to the data exchange area 33.

As described herein, the communication module 11 presents automation device data located in the data exchange area 33 to the network 19 as defined by product identity, protocol options and data mapping configuration data 34,35, 36 stored in flash ROM 16. The configuration data has complete control over the manner in which the automation device data is presented to the network.

The foregoing description of data presentation to the network is general in nature. The following examples more specifically describe the inventive data presentation method by describing the presentation of the same automation device data to three different networks of varying capabilities.

Conforming to a Device Profile—Examples

Figure 14:
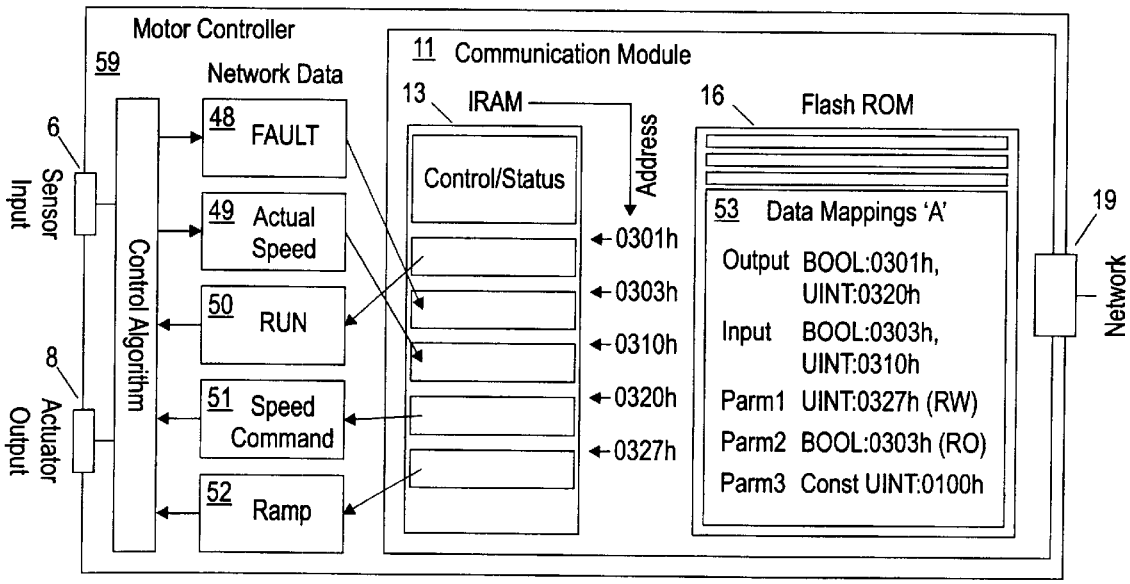
FIG. 14 is a simplified block diagram of a Motor Controller automation device with network connectivity in compliance with the device profile of FIG. 13 provided by a suitably configured communication module.
Figure 16:
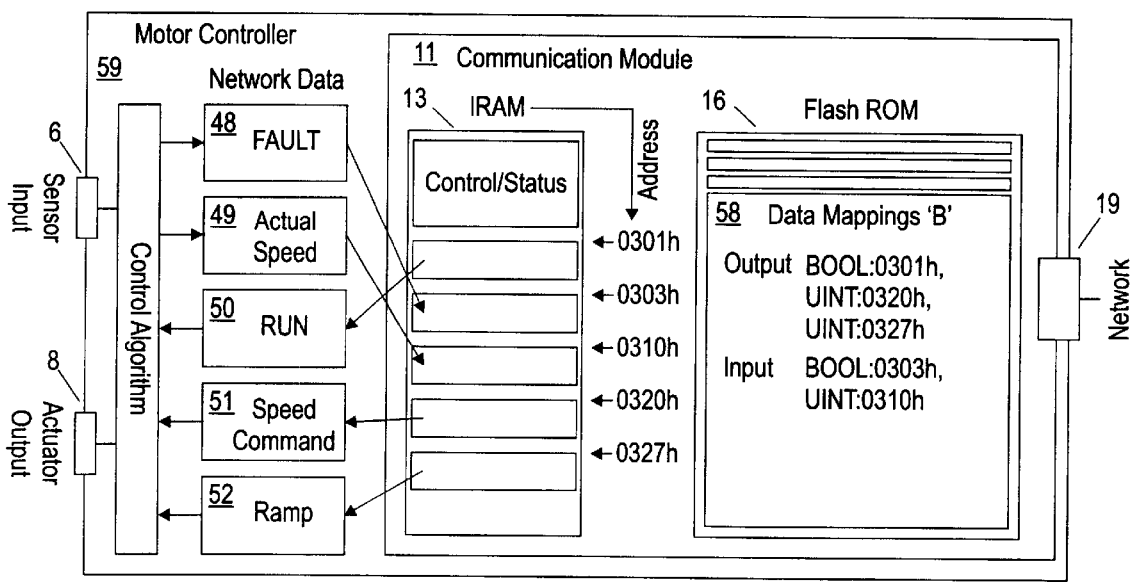
FIG. 16 is a simplified block diagram of a Motor Controller automation device with network connectivity in compliance with the device profile of FIG. 15 provided by a suitably configured communication module.
Figure 18:
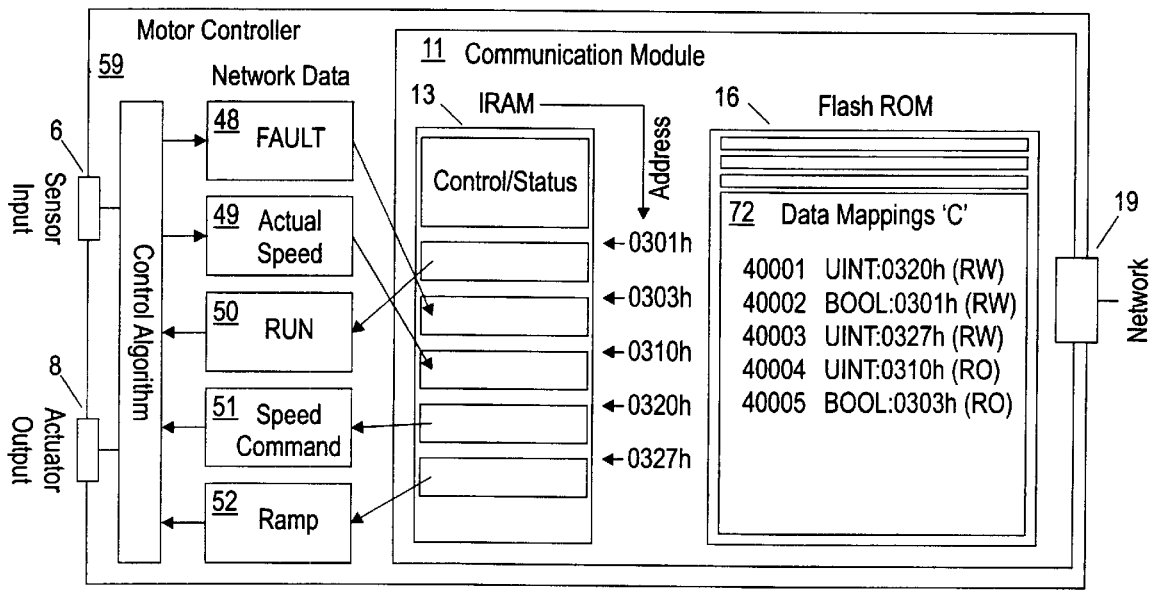
FIG. 18 is a simplified block diagram of a Motor Controller automation device with network connectivity in compliance with the device profile of FIG. 17 provided by a suitably configured communication module.

Referring to FIGS. 14, 16 and 18, a hypothetical motor controller 59 automation device 1, has three control parameters 50,51,52 that are received from the network 19 and two status parameters 48,49 that are sent to the network 19. The control algorithm in the motor controller 59 regulates the actuator output 8 subject to the control parameters 50,51,52 and sensor input 6, and generates the status parameters 48,49. The motor controller reads the control parameters 50,51,52 and writes the status parameters 48,49 to/from IRAM 13 locations assigned by the motor controller developer, using the abstract data exchange interface described herein.

The following three examples illustrate how the motor controller 59 is interfaced to three different networks by the application of three different suitably configured communication modules 11.

Conforming to a Device Profile—Example A

Figure 13:
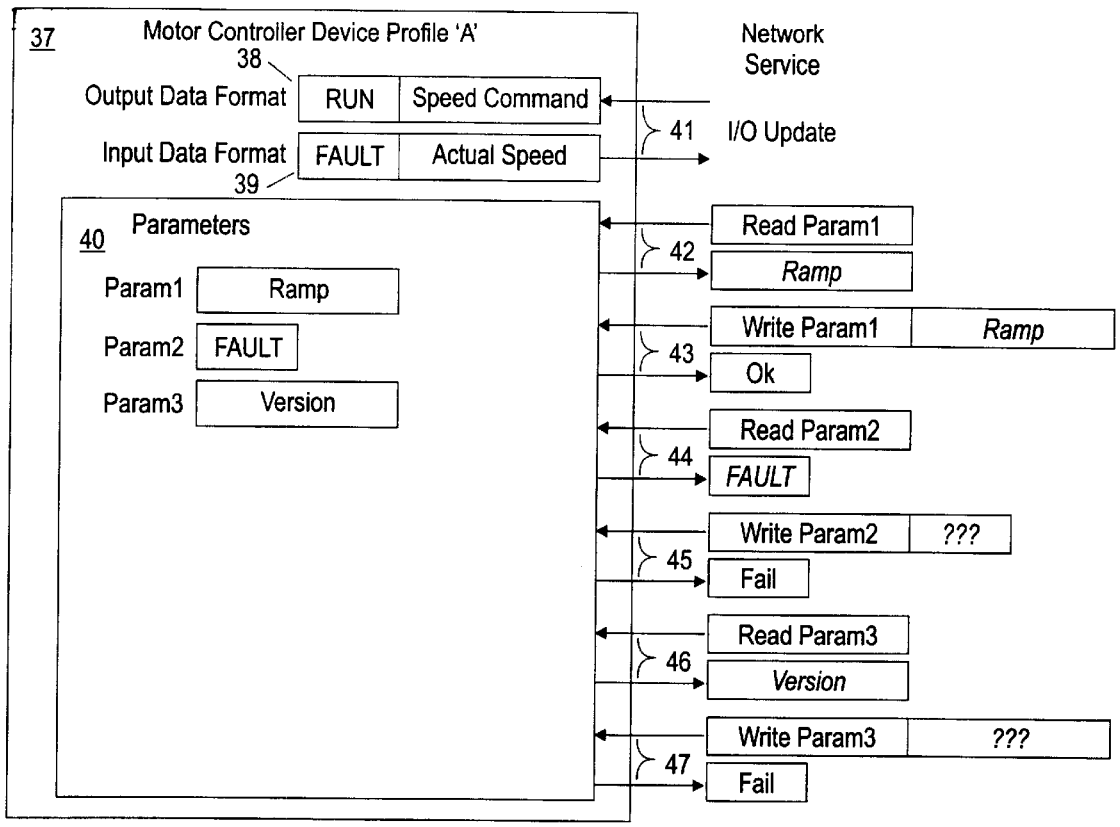
FIG. 13 represents a hypothetical device profile for a Motor Controller automation device typical of networks that provide both cyclic I/O and messaging network services.

FIG. 13 illustrates the motor controller device profile 37 for a network that provides both I/O update and parameter read/write services.

The network I/O update service 41 sends an output message with a pre-defined format 38 to the motor controller device at a regular interval which triggers it to respond with an input message with a pre-defined format 39.

Parameter read/write services 42,43,44,45,46,47 provide flexible access to parameters by way of a request message to the motor controller device with a command, a parameter identifier and in the case of a write command, a data value. The motor controller device sends a response message acknowledging the command, and in the case of a read command, the requested data value.

FIG. 14 illustrates the example motor controller 59 with a communication module 11 containing data mappings 53 that implement the device profile of FIG. 13.

Referring to FIGS. 13 and 14, when the communication module 11 receives an I/O update 41 output message 38 it processes it according to the data mappings 53 stored in the Flash ROM 16. It stores the first output message 38 component, data type BOOL, in IRAM location 0301h and the second component, data type UINT, in IRAM location 0320h. After processing the output message 38, the communication module 11 builds an input message 39 according to the data mappings 53 stored in Flash ROM 16. It sets the first input message 39 component, data type BOOL, from IRAM location 0303h and the second component, data type UINT, from IRAM location 0310h.

Thus, the communication module 11 interprets output messages 38 and generates input messages 39 defined by the device profile 37, assigning the various data components of these messages to IRAM locations specified by data mappings 53 stored in Flash ROM 16.

When a parameter access request 42,43,44,45,46,47 is received, the communication module 11 processes it according to the data mappings 53 and returns an appropriate response. A request to read Param1 42 results in the data stored in IRAM location 0327h, data type UINT, being returned in the response message. A request to write Param1 43 results in the value in the request message, data type UINT, being stored in IRAM location 0327h. A request to read Param2 44 results in the data stored in IRAM location 0303h, data type BOOL, to be returned in the response message. A request to write Param2 45 results in an error response being returned since the data mappings 53 specify that Param2 is read-only. A request to read Param3 46 results in the constant value 0100h, data type UINT, being returned in the response message. A request to write Param3 47 results in an error response being returned since the data mappings 53 specify that Param3 is a constant and therefore read-only. All other read/write requests result in appropriate error responses.

Thus, the communication module 11 responds to predefined parameter read/write requests, storing received data in IRAM, and generating suitable responses including constants and data from IRAM as specified by data mappings 53 stored in Flash ROM 16.

Conforming to a Device Profile—Example B

Figure 15:
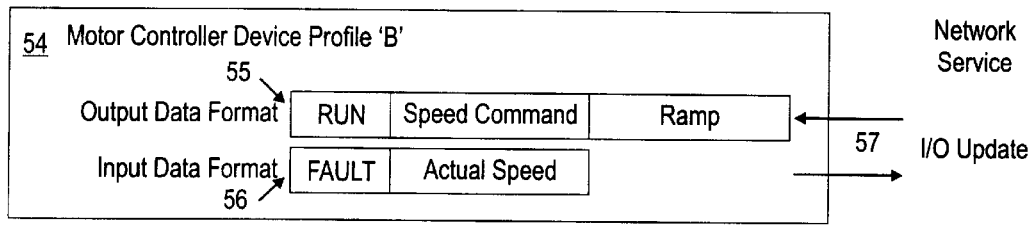
FIG. 15 represents a second hypothetical device profile for a Motor Controller automation device typical of networks that support only cyclic I/O network services.

FIG. 15 illustrates the motor controller device profile 54 for a network that provides only I/O update services.

The network I/O update service 57 sends an output message with a pre-defined format 55 to the motor controller device at a regular interval which triggers it to respond with an input message with a pre-defined format 56.

FIG. 16 illustrates the example motor controller 59 with a communication module 11 containing data mappings 58 that implement the device profile of FIG. 15.

Referring to FIGS. 15 and 16, when the communication module 11 receives an I/O update 57 output message 55 it processes it according to the data mappings 58 stored in the Flash ROM 16. It stores the first output message 55 component, data type BOOL, in IRAM location 0301h, the second component, data type UINT, in IRAM location 0320h and the third component, data type UINT, in IRAM location 327h. After processing the output message 55, the communication module builds an input message 56 according to the data mappings 58 stored in Flash ROM 16. It sets the first input message 56 component, data type BOOL, from IRAM location 0303h and the second component, data type UINT, from IRAM location 0310h.

Thus, the communication module 11 interprets output messages 55 and generates input messages 56 defined by the device profile 54, assigning the various data components of these messages to IRAM locations specified by data mappings 58 stored in Flash ROM 16.

Conforming to a Device Profile—Example C

Figure 17:
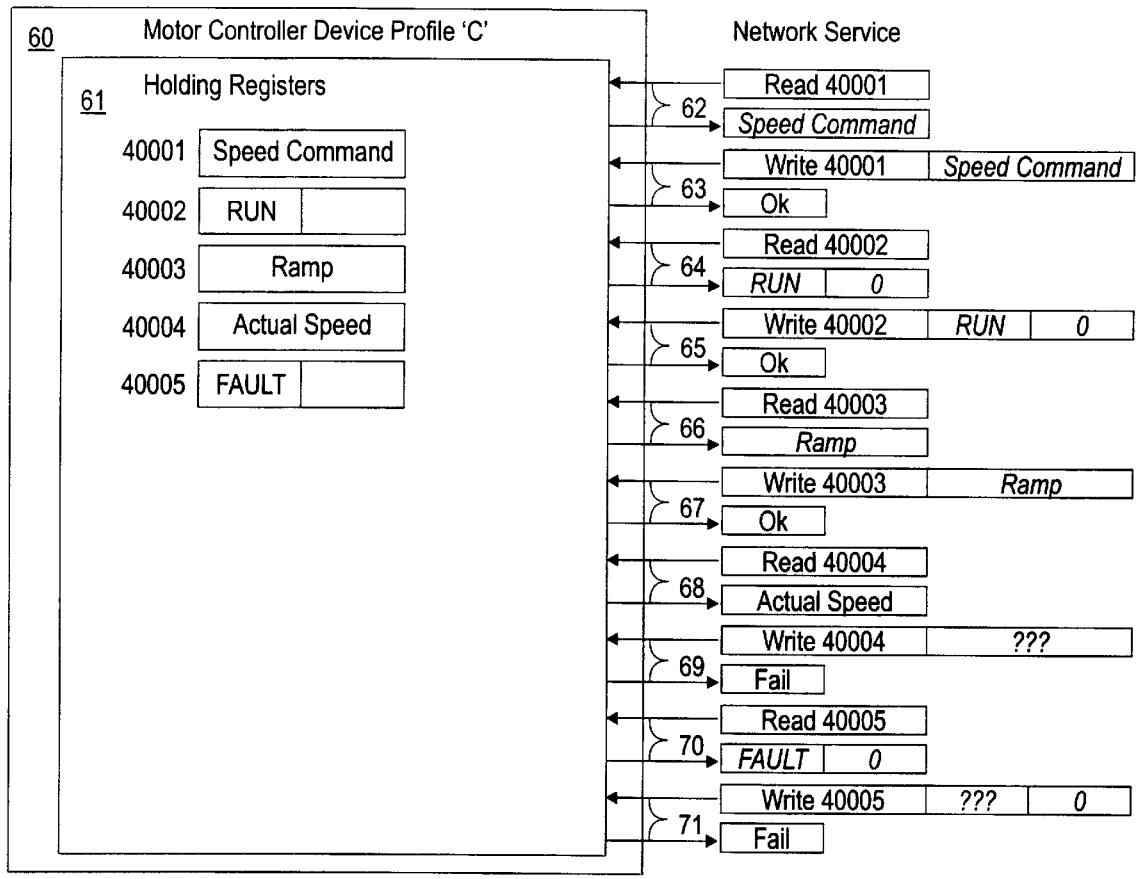
FIG. 17 represents a third hypothetical device profile for a Motor Controller automation device typical of networks that provide only messaging network services.

FIG. 17 illustrates the motor controller device profile 60 for a network that provides only register read/write services.

Register read/write services 62, 63, 64, 65, 66, 67, 68, 69, 70 and 71 provide access to data by way of a request message to the motor controller device with a command, a register identifier and in the case of a write command, a data value. The motor controller device sends a response message acknowledging the command, and in the case of a read command, the contents of the requested register.

FIG. 18 illustrates the example motor controller 59 with a communication module 11 containing data mappings 72 that implement the device profile of FIG. 17.

Referring to FIGS. 17 and 18, when a register access request 62, 63, 64, 65, 66, 67, 68, 69, 70 and 71 is received, the communication module 11 processes it according to the data mappings 72 and returns an appropriate response. A request to read register 40001 62 results in the data stored in IRAM location 0320h, data type UINT, being returned in the response message. A request to write register 40001 63 results in the value in the request message, data type UINT, being stored in IRAM location 0320h. A request to read register 40002 64 results in the data stored in IRAM location 0301h, data type BOOL, being returned in the response message. Since the network does not support the BOOL data type, an automatic conversion to a suitable network data type is performed. A request to write register 40002 65 results in the value in the request message being converted to data type BOOL and stored in IRAM location 0301h. A request to read register 40003 66 results in the data stored in IRAM location 0327h, data type UINT, being returned in the response message. A request to write register 40003 67 results in the value in the request message, data type UINT, being stored in IRAM location 0327h. A request to read register 40004 68 results in the data stored in IRAM location 0310h, data type UINT, being returned in the response message. A request to write register 40004 69 results in an error response being returned since the data mappings 72 specify that register 40004 is read-only. A request to read register 40005 70 results in the data stored in IRAM location 0303h, data type BOOL, being returned in the response message. Since the network does not support the BOOL data type, an automatic conversion to a suitable network data type is performed. A request to write register 40005 71 results in an error response being returned since the data mappings 72 specify that register 40005 is read-only. All other read/write requests result in appropriate error responses.

Thus, the communication module 11 responds to pre-defined register read/write requests, storing received data in IRAM, and generating suitable responses including data from IRAM as specified by data mappings 72 stored in Flash ROM 16.

There has thus been shown a universal communication system which includes a number of communication modules each of which connects an automation device such as a controller, sensor, actuator or input/output device to any one of various communication networks each having its own network-specific operating services and protocols, or procedures. All communications modules present the same physical, electrical and logical interface to a given automation device and each module is further adapted to transfer data between its associated device and the networks using network-specific services and protocols. Each communication module includes an interface random access memory (IRAM) and a non-volatile flash read only memory (ROM).

The IRAM is divided into two main areas: a pre-defined control/status area and a free-format data exchange area. Pre-defined locations in the IRAM are used to control and monitor the transfer of data, while data to be exchanged with a network is placed in the IRAM's data exchange area. Automation devices have a specific IRAM location assigned to each data item, either pre-defined by the automation device designer, or defined by variable configuration data stored in the automation device. The Flash ROM is programmed to accommodate the IRAM location assignment of the automation device by assigning an IRAM location and corresponding network transactions for each data item for use by the communication module as network-specific configuration data for any one of the several networks. Data is read from selected IRAM locations and provided to a network in accordance with the specific operating services and protocols of the requesting network.

While particular embodiments of the present invention have been shown and described, it will be obvious to those skilled in the art that changes and modifications may be made without departing from the invention in its broader aspects. Therefore, the aim in the appended claim's is to cover all such changes and modifications as fall within the true spirit and scope of the invention. The matter set forth in the foregoing description and accompanying drawing is offered by way of illustration only and not as a limitation. The actual scope of the invention is intended to be defined in the following claims when viewed in their proper perspective based on the prior art.

I claim:

1. A communication method between a plurality of automation devices and any one of a plurality of networks, wherein each network is characterized by a set of network-specific services and protocols and each automation device is characterized by device-specific data, said method comprising the steps of:

organizing an interface RAM into a first control/status area for storing data common to the operation of all of the automation devices and a second free-format data exchange area for storing device-specific data for each of the automation devices;

assigning each of the data common to the operation of all of the automation devices to a respective first data address location in the first control/status area of the interface RAM;

assigning each of the device-specific data to a respective second data address location in the second free-format data exchange area of the interface RAM, wherein data is written into and read from said first and second data address locations in accordance with a specified universal service and protocol independent of each of said networks; and providing data from said first and second data address locations respectively in said first control/status area and said second free-format data exchange area to a given network in accordance with the specified service and protocol of said given network and configuration data stored in a non-volatile memory.

2. The method of claim 1 further comprising the step of controlling the operation or monitoring the status of an operating device coupled to an automation device.

3. The method of claim 2 wherein said operating device is a control actuator or a video display, an wherein the operation of said control actuator or video display is controlled by outputs from said automation device.

4. The method of claim 2 wherein said operating device is a sensor or operator input device, and wherein the status of said sensor or operator input device is monitored by said automation device.

5. The method of claim 1 further comprising the step of incrementing an address in said first or second data address locations when data is provided from said first or second data address locations or when data is written into said interface RAM to repeat a data transfer between an automation device and a network.

6. The method of claim 1 wherein the data common to the operation of all of the automation devices includes control and status data.

7. The method of claim 1 further comprising the step of providing inquiries at regular intervals to each of said automation devices for monitoring the status of each of said automation devices.

8. The method of claim 1 wherein the step of assigning each of the device-specific data to a respective second data address location includes dividing the device-specific data into product identity information, protocol options and data mappings.

9. A communication system between a plurality of automation devices and any one of a plurality of networks, wherein each network is characterized by a set of network-specific services and protocols and each automation device is characterized by device-specific data, said system comprising:

a random access memory having a first control/status data storage area for storing data common to the operation of all of the automation devices and a second free-format data exchange area for storing device-specific data for each of the automation devices;

a controller coupled to said random access memory for assigning each of the data common to operation of all of the automation devices to a respective first data address location in said first control/status data storage area and assigning each of the device-specific data to a respective second data address location in the second free-format data exchange area of said random access memory, wherein said controller further writes data into and reads data from said first and second data address locations in accordance with a specified universal service and protocol independent of each of the networks; and an interface circuit coupling said random access memory to said plurality of networks for providing data from said first and second data address locations respectively in said first control/status area and said second free-format data exchange area to a given network in accordance with the specified service and protocol of said given network and configuration data stored in said controller.

10. The communication system of claim 9 wherein said random access memory is an interface random access memory (IRAM) and said controller is a flash read only memory (ROM), and wherein said flash ROM is programmed to assign each of the data common to operation of all of the automation devices to a respective first data address location in said first control/status data storage area and to assign each of the device-specific data to a respective second data address location in the second free-format data exchange area of said IRAM.

11. The communication system of claim 10 wherein a device-specific data for each of the automation devices includes product identity information, protocol options or data mappings.

12. The communication system of claim 11 further comprising an operating device coupled to and controlled or monitored by said automation device.

13. The communication system of claim 12 wherein said operating device is a control actuator or video display and said communication system controls the operation of said control actuator or video display.

14. The communication system of claim 12 wherein said operating device is a sensor or operator input device and said communication system monitors outputs from said sensor or operator input device.

15. The communication system of claim 10 wherein said IRAM, flash ROM, and interface circuit comprise a communication module.

16. A communication system for coupling a plurality operating devices to a network, wherein said network is characterized by a set of network-specific services and protocols and communicates control/status information to/from each of said operating devices, and wherein said control/status information includes data common to all of the operating devices and device specific data for each of the operating devices, said communication system comprising:

a plurality of communications modules each coupling a respective operating device to the network;

a plurality of first memories each associated with a respective communications module, wherein each of said first memories includes a first control/status area having a first plurality of data address locations and a second free-format data exchange area having a second plurality of data address locations, wherein the data common to all of the operating devices is stored in said first plurality of data address locations; and a plurality of second memories each associated with a respective communications module and its associated first memory, wherein each of said second memories includes a data mapping arrangement for writing device-specific data into and reading device-specific data from said second plurality of data address locations in accordance with a specified universal service and protocol, and wherein said specified universal service and protocol is independent of the network-specific services and protocols of each of the networks.

17. The communication system of claim 16 wherein each of said first memories is an intermediate random access memory.

18. The communication system of claim 17 wherein each of said second memories is a flash read-only memory.

19. The communication system of claim 16 wherein each of said second plurality of data address locations has assigned an associated network-specific service and protocol.

20. The communications system of claim 19 wherein network-specific services and protocols stored in each second memory includes operating device identity information, network protocol options and data mappings.

21. The communications system of claim 16 wherein said data mapping arrangement defines each of said second plurality of data address locations in accordance with the specified universal service and protocol stored therein.

* * * * *